May 31, 1932. W. T. TAYLOR 1,860,602

POLYPHASE TRANSFORMER SYSTEM

Filed June 28, 1929

William Thomas Taylor Inventor

By Attorney

Patented May 31, 1932

1,860,602

UNITED STATES PATENT OFFICE

WILLIAM THOMAS TAYLOR, OF EAST FINCHLEY, ENGLAND

POLYPHASE TRANSFORMER SYSTEM

Application filed June 28, 1929. Serial No. 374,562.

This invention relates to electrical transformation for electrical transmission and distribution systems using one or more banks of single-phase units or, one or more polyphase units.

For the three-phase closed- and open-delta systems there is no true neutral point. The improved system, in diagram, takes the form of the letter A and comprises an open-delta or V-connection with a single phase transformer unit connected across the V at a point on each of the two phase-windings to form the letter A, at the center of which single phase unit a true neutral point may be obtained for star-delta supply. This improvement is found desirable in practice to prevent, among other objections, the third harmonic current passing out to the line, also to permit a symmetrical three-phase combined star-delta system for the supply of a 4-wire or a combined light and power service, or for any other purpose, with equal voltages from the respective phase-conductors to the earthed point which for this system is the true neutral point and is equal to 57.7 per cent of the respective phase voltages.

The invention is illustrated in the accompanying drawings, in which:

Fig. 1a shows the voltage vector relations of the connections of Fig. 1.

Fig. 2a shows the voltage vector relation of the delta arrangement of Fig. 2 after the invention has been applied thereto by extending the two phase-legs to give a voltage higher than the original delta phase or line value of Fig. 2.

Figure 2:
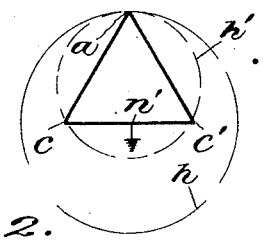
Fig. 2 shows the voltage vector relations of the ordinary delta connected system with earth connection at the center of one of the phase-windings.
Figure 1:
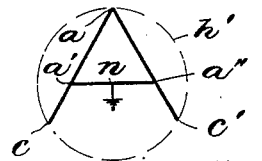
Fig. 1 is a circuit diagram showing the secondary windings of a three-phase transformer or a bank of three single-phase transformers connected in accordance with my invention, the primary being connected in delta.
Figure 1:
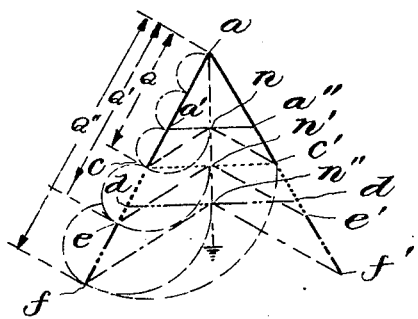
Figure 1:
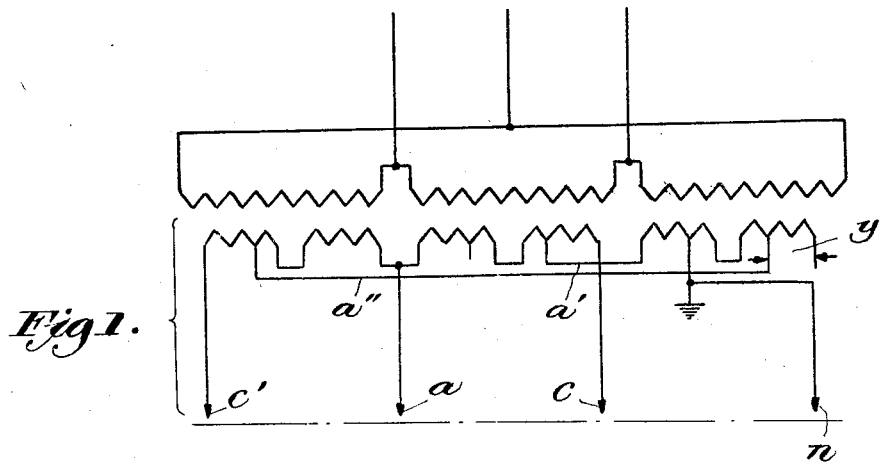

Electrical systems with neutral or earthed return circuit are in common use at the present time and in their arrangement the earthed neutral or the earthed return-conductor must for best service have equal voltages between the different phase conductors and the earthed neutral or the earthed return-conductor. The universal practice of today is to employ a delta-connected system and earth connection as shown in Fig. 2 to give a "minimum" voltage to earth. The actual relative minimum phase-voltages to earth are $h$ for Fig. 2 and $h'$ for Figs. 1 and 1a, hence the closed- and open-delta systems provide for unequal voltages to earth, except when the phase itself is earthed, whereas the system of Figs. 1 and 1a and 2a provide for equal voltages to earth as well as absolute minimum voltages to earth.

This invention provides a neutral point for the open-delta system, and for a closed-delta system it provides for a direct increase in voltage without changing the phase relations and without the hitherto conventional change limited to the star-connection.

The ordinary closed-delta-connected system is shown in Fig. 2. For converting such a closed delta system to the system of the present invention, two single-phase transformer units $c$—$e$, $c'$—$e'$ (Fig. 2a) each equal to one half $cn'c'$ of Fig. 2, are connected respectively at $c$ and $c'$ as indicated in dotted lines in Fig. 2a, with one end of each, $e$ and $e'$, left open, and in phase with $a$—$c$ and $a$—$c'$, respectively. This figure forming the letter A clearly shows the distinction between its voltage vectors and relations and those of existing polyphase systems such as the Y, Z, delta, V, T, and so forth. This change converts the delta and also increases the phase voltages from $ac$ and $ac'$ to $ae$ and $ae'$. The point $n'$ automatically becomes the true neutral point of the new system. The voltage increase is thus 50 per cent.

For a change in the voltages to 100 per cent increase the maximum phase-voltages to earth will be increased only 31.6 per cent. With an increase in phase voltages of 50 per cent, the maximum voltages between phase-conductors and earth is just the same as the maximum voltage from phase to earth for Fig. 2.

For a 100 per cent voltage increase, a phase unit equal to $a$—$c$, is connected at one end to the end $c$ to form $c$—$f$ (Fig. 1$a$) and likewise for the other phase to make $c'$—$f'$, and a phase unit $d$—$n''$ equal to $a'na''$ is connected at $d$ and joined to a similar winding $n''$—$d'$ at $n''$, the other end of such similar winding being connected at $d'$. Thus in this improved system the maximum voltage to earth for a 200 or 400 volt secondary distribution is fixed at 115 or 230 volts for all phases, whereas in the usual delta system as shown in Fig. 2, the maximum voltage to earth is odd and is 173 or 347 volts between $a$ and $n'$. Should the voltage Q (Fig. 2$a$) between respective phases for Figs. 1$a$ and 2$a$ be 200 and should it be required to raise the voltage to 400 volts because of excessive power loss or voltage drop then the end of phase-winding $ac$ and $ac'$ are respectively connected to a similar phase-winding $cf$ and $c'f'$ so that $ac$ is in phase with $cf$, and $ac'$ in phase with $c'f'$. The winding $dn''d'$ is simply two $a'na''$ windings connected in series. In this way a standard system voltage is obtained and the very best use is made of existing apparatus and equipment. The phase voltage to earth is only 31.6 per cent higher for the 100 per cent increase in phase voltage; the simplest possible changes are made; parallel operation is improved because the phase relations of star and delta systems are not disturbed; the delta or star-connected units may be changed over at will without touching or disturbing the transformers or units.

On most systems and circuits a time arrives when the load has increased so heavily that the best or the only remedy is to raise the line voltage in order to decrease the heavy losses, and the only hitherto available system for conversion was the Y or star. A conversion to the star-connection brings about a phase displacement in the first place and allows of a voltage step increase of 73.2 per cent requiring three phase-windings and making obsolete existing star-connected transformers and all those delta-connected units not yet changed over as a result of the phase displacement. The improved system, A, is directly applicable to increases of voltage in steps of 50 and 100 per cent with a true neutral point in each case as well as symmetrical voltages and balanced phase relations unchanged. Only ⅓rd. of the number of phase units are required or a minimum of ⅓rd. increased kVA. capacity for either 50 or 100 per cent increase in phase voltage, without any increase in the voltage stress to earth for the former compared with Fig. 2. This invention thus provides an improved system that gives the same maximum voltage to earth on all phases and it offers a truly symmetrical polyphase system with line voltage such that the same line insulators can be used with greater safety than when converting the delta system to the star system and it does this without phase displacement. This invention also provides for the best use of spare units to be connected across $cc'$ or $ee'$ or $ff'$, as desired, instead of having them stand idle to absorb moisture and become a hazard. Moreover, the invention is not necessarily confined to 50 and 100 per cent voltage increases as the voltage may be varied by any desired percentage or amount by lengthening or shortening the legs $a'cdef$ and $a''c'd'e'f'$, and by connecting the windings $a'na''$, $cn'c'$, $dn''d'$, etc., as desired, at one-third distance from the two open ends, respectively.

Referring to Fig. 1 the connections shown therein conform to the vector voltages $aa'$, $cnc'$ $a''$ $a$ of Figs. 1$a$ and 2$a$. A delta-connected primary is shown for simplicity but the system connections of Fig. 1$a$ may be used on both sides or the primary may be connected in star or zigzag or any of the conventional three-phase connections or relations may be used on any one side, and the system applies to any voltage on any one or both sides. The portion of the winding $y$ may or may not be included and is shown here simply to conform to the practical expedient of using for the horizontal bar of the A connection, a standard phase winding properly tapped for the use of two-thirds thereof. For present use and future extensions and development of the system, where the greatest flexibility and adaptability are the criterion, the taps or a division of the windings at the said taps on each phase unit are important.

Referring to Fig. 2 the universal delta-connected system with earthed point is shown. This is redrawn in Fig. 2$a$ which also shows two of the three phases or legs extended for the purpose of increasing the system voltage by the same conversion A system as Figs. 1 and 1$a$ for the purpose in this case of extending the system by increasing the voltage, by a conversion of the delta system to the present A system, without changing the phase relations. Fig. 2$a$ shows a 50 per cent voltage increase, Q', also a direct 100 per cent voltage increase, Q'', using the same total phase-winding without altering any of the connections or going into the transformers.

Having now particularly described and ascertained the nature of my said invention and in what manner the same is to be performed, I declare that what I claim is:

1. A three phase transformer system comprising windings connected to form the letter A.

2. A three phase transformer system comprising windings connected to form the letter A with a neutral connection tapped at substantially the center of the winding which forms the horizontal bar of the A.

3. A three phase transformer system comprising windings connected in the form of the letter A with the winding represented by the horizontal bar of the A having an electrical length substantially equal to two thirds of the length of the other windings.

4. A three phase transformer system comprising windings connected to form the letter A, with the horizontal winding connected to the two side windings at points substantially two thirds from the apex of the A.

5. A three-phase transformer system having one set of windings electrically connected in the form of the letter A.

6. A transformer system for connecting a three-phase three-wire system of distribution with a three-phase four-wire system of distribution, in which a set of windings is connected with the four-wire system in the form of the letter A with the apex and each of the lower ends of the side elements of the A connected respectively to each of the three phase-wires of the four-wire system.

7. A transformer system as claimed in claim 6 in which a winding which forms the horizontal bar of the A has two-thirds the number of turns of each side element of the A.

8. A transformer system as claimed in claim 6 in which a winding which forms the horizontal bar of the letter A is electrically two-thirds that of each side element of the A and is tapped substantially at its electrical center to form a true neutral point.

9. A transformer system for connecting a three-phase three-wire system of distribution to a three-phase four-wire system of distribution, having one set of transformer windings connected to the three-wire system in open delta, and another set connected to the four-wire system in the form of the letter A, with the winding which forms the horizontal bar of the letter A tapped intermediate its ends to form a neutral connection, and the apex and each of the lower ends of the side elements of the A connected respectively to each of the three phase-wires of the four-wire system.

10. A transformer system for connecting a three-phase three-wire system of distribution to a three-phase four-wire system of distribution with true neutral, having one set of transformer windings connected to the three-wire system in closed delta and another set connected to the four-wire system in the form of the letter A with the winding which forms the horizontal bar of the letter A tapped intermediate its ends to provide the neutral connection, and the apex and each of the lower ends of the side elements of the A connected respectively to each of the three phase-wires of the four-wire system.

WILLIAM THOMAS TAYLOR.